(12) United States Patent
Chen

(10) Patent No.: US 11,153,053 B2
(45) Date of Patent: Oct. 19, 2021

(54) METHOD OF PERFORMING DATA TRANSMISSION BY TERMINAL DEVICE IN A WIRELESS COMMUNICATION SYSTEM

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/626,236

(22) PCT Filed: Jul. 31, 2017

(86) PCT No.: PCT/CN2017/095259
§ 371 (c)(1),
(2) Date: Dec. 23, 2019

(87) PCT Pub. No.: WO2019/023876
PCT Pub. Date: Feb. 7, 2019

(65) Prior Publication Data
US 2020/0119879 A1 Apr. 16, 2020

(51) Int. Cl.
*H04L 27/26* (2006.01)
*H04L 5/00* (2006.01)
(Continued)

(52) U.S. Cl.
CPC ............ *H04L 5/0051* (2013.01); *H04L 5/005* (2013.01); *H04L 27/261* (2013.01); *H04W 72/042* (2013.01); *H04B 7/0626* (2013.01)

(58) Field of Classification Search
CPC ..... H04L 5/0051; H04L 5/005; H04L 27/261; H04W 72/04; H04W 72/042; H04B 7/0626
See application file for complete search history.

(56) References Cited

U.S. PATENT DOCUMENTS

| 8,934,430 B2 | 1/2015 | Zhai |
| 9,800,381 B2 | 10/2017 | Chen |

(Continued)

FOREIGN PATENT DOCUMENTS

| CN | 102076076 A | 5/2011 |
| CN | 102082595 A | 6/2011 |

(Continued)

OTHER PUBLICATIONS

Samsung: "On QCL for NR", 3GPP Draft;R1-170797 QCL, 3rd Generation Partership Project (3GPP), Mobile Competence Centre; 650, Route des Licoles; F-06921 Sophia-Anti Polis CEDEX ; France, vol. RAN WG1, No. Hangzhou, China; 20170515-201705196 May 2017(May 6, 2017), XP051262159, Retrieved from the Internet: URL:http://www.3gpp.org/ftp/tsg_ran/WG1_RL1/TSGR1_89/Docs/ [retrieved on May 6, 2017].

(Continued)

*Primary Examiner* — Wei Zhao
(74) *Attorney, Agent, or Firm* — Ladas & Parry LLP

(57) ABSTRACT

The embodiments of the present application provide a data transmission method and a terminal device, being able to improve the uplink transmission rate The method comprises: receiving at least two DMRS port groups configured by a network device; determining a target reference signal resource corresponding to each of the at least two DMRS port groups; determining, according to the target reference signal resource, transmission parameters for transmitting data on the DMRS port group corresponding to the target reference signal resource; and when the transmission parameters for transmitting data on each DMRS port group are determined, performing data transmission on the at least two DMRS port groups.

20 Claims, 2 Drawing Sheets

(51) Int. Cl.
  *H04W 72/04* (2009.01)
  *H04B 7/06* (2006.01)

(56) References Cited

U.S. PATENT DOCUMENTS

| | | | |
|---|---|---|---|
| 2012/0207119 | A1 | 8/2012 | Zhang |
| 2013/0022087 | A1 | 1/2013 | Chen |
| 2015/0092722 | A1 | 4/2015 | Zhang |
| 2018/0331871 | A1* | 11/2018 | Martinez ............. H04W 88/085 |
| 2018/0332605 | A1* | 11/2018 | Pelletier ............ H04W 72/1242 |
| 2019/0379433 | A1* | 12/2019 | Chen .................... H04B 7/0417 |

FOREIGN PATENT DOCUMENTS

| | | |
|---|---|---|
| CN | 106559363 A | 4/2017 |
| EP | 2942888 A1 | 11/2015 |
| EP | 3277015 A1 | 1/2018 |
| RU | 2601738 C2 | 11/2016 |
| WO | 2016152315 A1 | 9/2016 |

OTHER PUBLICATIONS

Huawei et al: "Details of QCL assumptions and related RS design considerations", 3GPP Draft; R1-1709935, 3rd Generation Partnership Project (3GPP), Mobile Competence Centre: 650, Route des Lucioles; F-06921 Sophia-Antipolis CEDEX; France vol. RAN WG1, No. Qingdao, China; 20170627-2017063026 Jun. 2017(Jun. 26, 2017), XP051299160, Retrived from the Internet: URL:http://www.3gpp.org/ftp/Meetings_3GPP_SYNC/RAN1/Docs/ [retrieved on Jun. 26, 2017].

Samsung: "Enhancement to Control Signaling", 3GPP Draft; R1-1705302-FECOMP Controlsignaling, 3rd Generation Partnership Project(3GPP), Mobile Competence Cenre; 650, Route des Lucioles; F-06921Sophia-Anti Polis CEDEX; France vol. RAN WG1, No. Spokane, USA; 20170403-20170407 Apr. 2, 2017(Apr. 2, 2017), XP051243242, Retrieved from the Internet: URL: http://www.3gpp.org/ftp/Meetings_3GPP_SYNC/RAN1/Docs/ [retrieved on Apr. 2, 2017].

Supplememtaru European Search Report in the European application No. 17919988.0, dated May 20, 2020.

Written Opinion of the International Search Authority in the international application No. PCT/CN2017/095259, dated Apr. 3, 2018.

Qualcomm Incorporated, "Discussion on QCL", 3GPP TSG RAN WG1 NR Ad-Hoc#2 R1-1711176, Jun. 27-30, 2017, Qingdao, China.

Nokia, Alcatel-Lucent Shanghai Bell, "On QCL Framework and Configurations in NR", 3GPP TSG RAN WG1 NR Ad-Hoc#2, R1-1711312, Qingdao, P.R China, Jun. 27-30, 2017.

First Office Action of the Russian application No. 2019144121, dated Aug. 19, 2020.

International Search Report in the international application No. PCT/CN2017/095259, dated Apr. 3, 2018.

First Office Action of the Canadian application No. 3066296, dated Feb. 11, 2021.

Supplementary European Search Report in the European application No. 21178530.8. dated Jul. 9, 2021.

First Office Action of the Japanese application No. 2020-501223, dated Aug. 17, 2021.

Written Opinion of the Singaporean application No. 11201912174Q, dated Aug. 24, 2021.

* cited by examiner

METHOD OF PERFORMING DATA TRANSMISSION BY TERMINAL DEVICE IN A WIRELESS COMMUNICATION SYSTEM

RELATED APPLICATION

This application is an application under 35 U.S.C. 371 of International Application No. PCT/CN2017/095259 filed on Jul. 31, 2017, the entire contents of which are incorporated herein by reference.

TECHNICAL FIELD

The disclosure relates to the field of communication, and more particularly to a method for data transmission and a terminal device.

BACKGROUND

In a New Radio (NR) system, a terminal device may implement uplink transmission through panels, and each panel has an independent radio frequency channel. At the present stage, a terminal device may implement uplink transmission through a single panel. However, during the uplink transmission through a single panel, a transmission rate is low and may not meet an increasing requirement on transmission rate.

SUMMARY

Embodiments of the disclosure provide a method for data transmission and a terminal device, which may improve an uplink transmission rate.

A first aspect provides a method for data transmission, which may include the following operations.

At least two Demodulation Reference Signal (DMRS) port groups configured by a network device are received.

A target reference signal resource corresponding to each of the at least two DMRS port groups is determined.

Transmission parameters for data transmission on DMRS port group corresponding to the target reference signal resource are determined according to the target reference signal resource.

After the transmission parameters for the data transmission on each DMRS port group are determined, the data transmission is performed on the at least two DMRS port groups.

Accordingly, in the method for the data transmission of the embodiments of the disclosure, the network device configures the at least two DMRS port groups for a terminal device; and the terminal device determines the target reference signal resource corresponding to each DMRS port group, determines the transmission parameters for the data transmission on the corresponding DMRS port group through the target reference signal resource, and then may transmit data on the corresponding DMRS port group according to the transmission parameters for the data transmission on each DMRS port group, so that the uplink transmission through multiple panels can be implemented, and an uplink transmission rate can be improved.

Optionally, in an implementation mode of the first aspect, the operation that the at least two DMRS port groups configured by the network device are received may include the following operations.

The at least two DMRS port groups configured by the network device through high-layer signaling are received; or the at least two DMRS port groups indicated by the network device through Downlink Control Information (DCI) from multiple DMRS port groups are received, wherein the multiple DMRS port groups are DMRS port groups pre-configured by the network device through the high-layer signaling.

Optionally, in an implementation mode of the first aspect, the operation that the at least two DMRS port groups configured by the network device are received may include the following operations.

A number of the at least two DMRS port groups indicated by the network device through the high-layer signaling or the DCI is received.

DMRS ports included in each of the at least two DMRS port groups are determined according to the number of the at least two DMRS port groups and a first preset condition, wherein the first preset condition is DMRS ports, predetermined by the network device and a terminal device, included in each DMRS port group under a present rank.

Optionally, in an implementation mode of the first aspect, the operation that the target reference signal resource corresponding to each of the at least two DMRS port groups is determined may include the following operations.

Resource indication information carried by the DCI used to schedule the data transmission on the at least two DMRS port groups is received from the network device, wherein the resource indication information is used to indicate the target reference signal resource corresponding to each DMRS port group.

The target reference signal resource corresponding to each DMRS port group is determined according to the resource indication information.

Optionally, in an implementation mode of the first aspect, the operation that the target reference signal resource corresponding to each of the at least two DMRS port groups is determined may include the following operation.

The target reference signal resource which is configured for each of the at least two DMRS port groups by the network device through the high-layer signaling is received.

Optionally, in an implementation mode of the first aspect, the operation that the transmission parameters for the data transmission on the DMRS port group corresponding to the target reference signal resource are determined according to the target reference signal resource may include the following operations.

Precoding matrix indication information is acquired from the network device.

A precoding matrix for the data transmission on the DMRS port group corresponding to the target reference signal resource is determined according to a number of antenna ports in the target reference signal resource and the precoding matrix indication information.

Optionally, in an implementation mode of the first aspect, the operation that the transmission parameters for the data transmission on the DMRS port group corresponding to the target reference signal resource are determined according to the target reference signal resource may include the following operation.

A beam for transmitting or receiving a reference signal on the target reference signal resource is determined as a beam for the data transmission on the DMRS port group corresponding to the target reference signal resource.

Optionally, in an implementation mode of the first aspect, the operation that the transmission parameters for the data transmission on the DMRS port group corresponding to the target reference signal resource are determined according to the target reference signal resource may include the following operation.

Transmission power for the data transmission on the DMRS port group corresponding to the target reference signal resource is determined according to a power control parameters corresponding to the target reference signal resource.

Optionally, in an implementation mode of the first aspect, the operation that the transmission power for the data transmission on the DMRS port group corresponding to the target reference signal resource is determined according to the power control parameters corresponding to the target reference signal resource may include the following operation.

The transmission power for the data transmission on the DMRS port group corresponding to the target reference signal resource is determined according to first power control parameters, wherein the first power control parameters are power control parameters used to calculate transmission power for reference signal transmission on the target reference signal resource.

Optionally, in an implementation mode of the first aspect, the operation that the transmission power for the data transmission on the DMRS port group corresponding to the target reference signal resource is determined according to the power control parameters corresponding to the target reference signal resource may include the following operation.

The transmission power for the data transmission on the DMRS port group corresponding to the target reference signal resource is determined according to second power control parameters, wherein the second power control parameters are power control parameters pre-configured by the network device to be associated with the target reference signal resource or the indication information of the target reference signal resource.

Optionally, in an implementation mode of the first aspect, the power control parameters may include at least one of an open loop power control parameter, a closed loop power control parameter or a path loss estimation value.

Optionally, in an implementation mode of the first aspect, the operation that the transmission parameters for the data transmission on the DMRS port group corresponding to the target reference signal resource are determined according to the target reference signal resource may include the following operation.

A panel for transmitting or receiving the reference signal on the target reference signal resource is determined as a panel for the data transmission on the DMRS port group corresponding to the target reference signal resource.

Optionally, in an implementation mode of the first aspect, the target reference signal resource may be a Sounding Reference Signal (SRS) resource or a Channel State Information Reference Signal (CSI-RS) resource.

A second aspect provides a terminal device, which is configured to execute the method in the first aspect or any possible implementation mode of the first aspect. Specifically, the terminal device includes units configured to execute the method in the first aspect or any possible implementation mode of the first aspect.

A third aspect provides a terminal device, which includes a memory, a processor, an input interface and an output interface. The memory, the processor, the input interface and the output interface are connected through a bus system. The memory is configured to store an instruction. The processor is configured to execute the instruction stored in the memory to execute the method in the first aspect or any possible implementation mode of the first aspect.

A fourth aspect provides a computer storage medium, which is configured to store computer software instructions for executing the method in the first aspect or any possible implementation mode of the first aspect, the computer storage medium includes programs designed to execute the abovementioned aspects.

A fifth aspect provides a computer program product including instructions, which runs in a computer to enable the computer to execute the method in the first aspect or any optional implementation mode of the first aspect.

DETAILED DESCRIPTION

The technical solutions in the embodiments of the disclosure will be described below in combination with the drawings in the embodiments of the disclosure.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) system.

Figure 1:
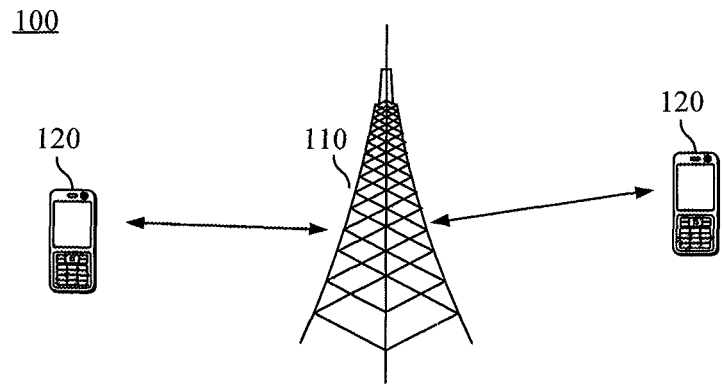
FIG. 1 is a schematic diagram of a wireless communication system according to an embodiment of the disclosure.

FIG. 1 illustrates a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) located in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle-mounted device a wearable device, a network-side device in a future 5G network, a network device in a future evolved Public Land Mobile Network (PLMN) or the like.

The wireless communication system 100 further includes at least one terminal device 120 within the coverage of the network device 110. The terminal device 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

Optionally, the terminal devices 120 may perform Device to Device (D2D) communication.

Optionally, the 5G system or network may also be called an NR system or network.

A network device and two terminal devices are exemplarily shown in FIG. 1. Optionally, the wireless communication system 100 may include multiple network devices and another number of terminal devices may be included in coverage of each network device. There are no limits made thereto in the embodiments of the disclosure.

In the wireless communication system 100, the terminal device may have one or more panels for uplink data transmission, and each panel has an independent radio frequency channel. A DMRS port group corresponds to a panel, and the terminal device may transmit data on a corresponding DMRS port group on the panel after transmission parameters of a panel are determined.

Optionally, the wireless communication system 100 may further include other network entity such as a network controller and a mobility management entity. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: independent existence of A, existence of both A and B and independent existence of B. In addition, character "/" in the disclosure usually represents that previous and next associated objects form an "or" relationship.

Figure 2:
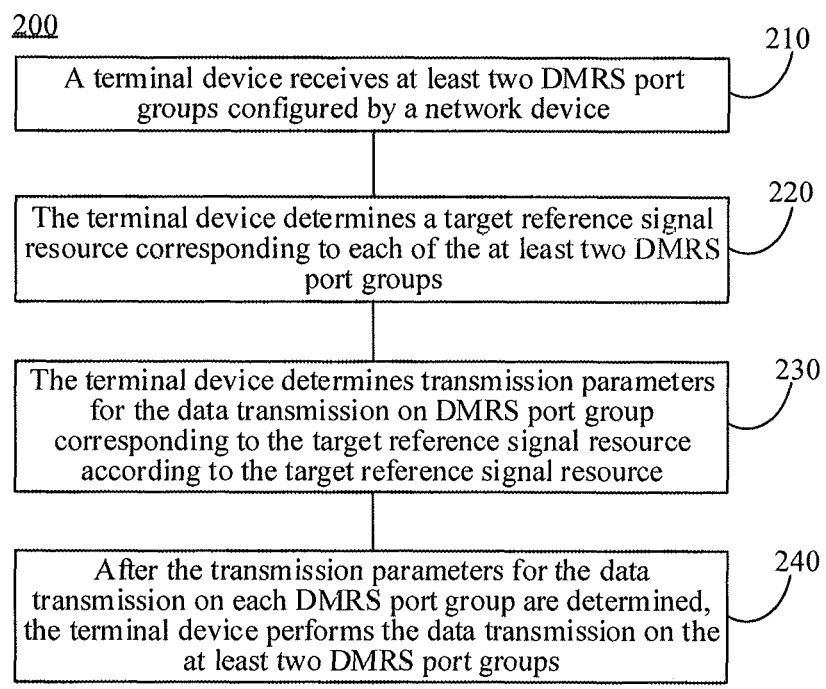
FIG. 2 is a schematic flowchart of a method for data transmission according to an embodiment of the disclosure.

FIG. 2 is a schematic flowchart of a method 200 for data transmission according to an embodiment of the disclosure. As shown in FIG. 2, the method 200 includes the following steps.

In 210, a terminal device receives at least two DMRS port groups configured by a network device.

It is to be understood that a DMRS port group includes at least one DMRS port.

Optionally, the network device may transmit control information (for example, an Up-Link Acknowledge (UL ACK)) on the DMRS port.

Optionally, upon receiving the DMRS port groups configured by the network device, the terminal device may acquire the corresponding control information therein.

Specifically, the terminal device may receive the at least two DMRS port groups configured by the network device in the following three manners.

A first manner: the terminal device receives the at least two DMRS port groups configured by the network device through high-layer signaling.

For example, the network device may configure the at least two DMRS port groups through Radio Resource Control (RRC) signaling or Media Access Control (MAC) signaling.

Specifically, the network device may separately configure a DMRS port group for each rank. For example, the network device may configure two DMRS port groups for rank=2 through the high-layer signaling. The first DMRS port group includes a DMRS port {0} and the second DMRS port group includes a DMRS port {1}. For another example, the network device may configure two DMRS port groups for rank=4 through the high-layer signaling. The first DMRS port group includes DMRS ports {0, 2} and the second DMRS port group includes DMRS ports {1, 3}. The terminal device may determine a present DMRS port group according to the rank.

A second manner: the terminal device receives the at least two DMRS port groups indicated by the network device through DCI from multiple DMRS port groups, herein the multiple DMRS port groups are DMRS port groups preconfigured by the network device through the high-layer signaling.

Optionally, the DCI may be used to schedule the data transmission on the at least two DMRS port groups.

Optionally, the at least two DMRS port groups of the multiple DMRS port groups may be indicated by indication information, for example, Rank Indication (RI) information, in the DCI.

For example, the network device may pre-configure four DMRS port groups {0}, {1}, {0, 1} and {2, 3} through the high-layer signaling and may indicate two DMRS port groups {0, 1} and {2, 3} that are presently used through an RI.

Optionally, the DMRS port groups may be indicated based on a bitmap. For example, if the terminal device supports at most two DMRS port groups, and the total number of DMRS ports is N (N≥2), a DMRS port of each DMRS port group may be indicated in a bitmap manner, herein the first DMRS port group includes a port identified to be 0 in a bitmap sequence and the second DMRS port group includes a port identified to be 1 in the bitmap sequence. If uplink transmission of the terminal device supports at most four DMRS ports, the DMRS ports included in the two DMRS port groups may be indicated by 4 bit information. For example, 0000 represents that only the first DMRS port group is used at present, and 0011 represents that each DMRS port group of the two DMRS port groups includes two DMRS ports.

A third manner: the terminal device receives the number of the at least two DMRS port groups indicated by the network device through the high-layer signaling or the DCI.

DMRS ports included in each of the at least two DMRS port groups is determined according to the number of the at least two DMRS port groups and a first preset condition, herein the first preset condition is a DMRS port, predetermined by the network device and the terminal device, included in each DMRS port group under a present rank.

Optionally, after the number of the at least two DMRS port groups is acquired, the terminal device may determine the total number of the DMRS ports according to the first preset condition.

For example, if the number of the DMRS port groups is 1, the DMRS port group includes all present DMRS ports. If the number of the DMRS port groups is 2 and the total number of the present DMRS ports is L (L≥2), the first DMRS port group includes the first L/2 (rounded down) DMRS ports and the second DMRS port group includes the other DMRS ports. The network device notifies whether the number of the present DMRS port groups is 1 or 2 through the high-layer signaling or the DCI, and then the terminal device may know the present DMRS port groups.

In 220, the terminal device determines a target reference signal resource corresponding to each of the at least two DMRS port groups.

Optionally, the target reference signal resource is an SRS resource or a CSI-RS resource.

It is to be understood that the target reference signal resource includes the number of antenna ports.

Specifically, the terminal device may determine the target reference signal resource corresponding to each of the at least two DMRS port groups in the following two manners.

A first manner: the terminal device receives resource indication information carried by the DCI used to schedule the data transmission on the at least two DMRS port groups from the network device, herein the resource indication information is used to indicate the target reference signal resource corresponding to each DMRS port group.

The target reference signal resource corresponding to each DMRS port group is determined according to the resource indication information.

Optionally, the resource indication information may be an SRS Resource Indicator (SRI) and may also be a CSI-RS Resource Indicator (CRI).

For example, if the terminal device supports at most two DMRS port groups, the DCI includes two SRI domain corresponding two DMRS port groups respectively. If only one DMRS port group is configured for the terminal device at present, the SRI domain corresponding to the other DMRS port group may be set to be a default value (for example, 0) or is used to indicate other information. The CRI is the same.

A second manner: the terminal device receives the target reference signal resource, which is configured for each of the at least two DMRS port groups by the network device through the high-layer signaling.

Specifically, the network device, upon configuring the at least two DMRS port groups through the high-layer signaling, may simultaneously configure the target reference signal resources corresponding to the at least two DMRS port groups.

For example, the network device may configure an SRI for each DMRS port group. If the network device pre-configures multiple DMRS port groups through the high-layer signaling and then indicates the DMRS port group for present data transmission through the DCI, the terminal device may determine a target reference signal resource for the DMRS port group corresponding to an SRI according to the SRI corresponding to each DMRS port group for present data transmission.

In 230, the terminal device determines, according to the target reference signal resource, transmission parameters for the data transmission on the DMRS port group corresponding to the target reference signal resource.

Optionally, the transmission parameters may be a beam, a precoding matrix, transmission power, panels and the like.

Optionally, the terminal device may determine the transmission parameters for the data transmission on the DMRS port group corresponding to the target reference signal resource in the following four manners.

A first manner: the terminal device acquires precoding matrix indication information from the network device and determines a precoding matrix for the data transmission on the DMRS port group corresponding to the target reference signal resource according to the number of antenna ports in the target reference signal resource and the precoding matrix indication information.

Optionally, the network device and the terminal device predetermine a corresponding relationship between the precoding matrix and each of the number of antenna ports and the precoding matrix indication information.

In such a manner, different DMRS port groups may correspond to different target reference signal resources and the number of antenna ports in different target reference signal resources may be different. Therefore, different precoding matrixes may be adopted for the data transmission on different DMRS port groups and are further matched with channel information of panels for transmitting corresponding data.

A second manner: the terminal device determines a beam for transmitting or receiving a reference signal on the target reference signal resource as a beam for the data transmission on the DMRS port group corresponding to the target reference signal resource.

For example, the terminal device determines a beam for transmitting an SRS on the target reference signal resource as a transmission beam for the data transmission; or, the terminal device determines a beam for receiving a CSI-RS on the target reference signal resource as the transmission beam for the data transmission.

In such a manner, different DMRS port groups may correspond to different target reference signal resources and beams for transmitting or receiving reference signals on different target reference signal resources are different. Therefore, different beams may be adopted for the data transmission on different DMRS port groups and are further matched with channel information of panels for transmitting corresponding data.

A third manner: the terminal device determines transmission power for the data transmission on the DMRS port group corresponding to the target reference signal resource according to power control parameters corresponding to the target reference signal resource.

Optionally, the operation that the transmission power for the data transmission on the DMRS port group corresponding to the target reference signal resource is determined according to the power control parameters corresponding to the target reference signal resource includes the following operation.

The transmission power for the data transmission on the DMRS port group corresponding to the target reference signal resource is determined according to first power control parameters, herein the first power control parameters are power control parameters used to calculate transmission power for reference signal transmission on the target reference signal resource.

Optionally, in such case, the target reference signal resource may be an SRS resource.

Specifically, the transmission power for reference signal transmission on the target reference signal resource may be determined as the transmission power for the data transmission on the DMRS port group corresponding to the target reference signal resource.

For example, the terminal device may determine transmission power for transmitting an SRS on a target SRS resource according to the first, power control parameters and may adopt the first power control parameters to determine transmission power for data on a DMRS port group corresponding to the target SRS resource. Different first power control parameters may be adopted for different SRS resources. Typically, the first power control parameters may include an uplink path loss estimation value and may also include a path loss estimation value and an open loop power control parameter.

Optionally, the operation that the transmission power for the data transmission on the DMRS port group corresponding to the target reference signal resource is determined according to the power control parameters corresponding to the target reference signal resource includes the following operation.

The transmission power for the data transmission on the DMRS port group corresponding to the target reference signal resource is determined according to second power control parameters, herein the second power control parameters are power control parameters pre-configured by the network device to be associated with the target reference signal resource or the indication information of the target reference signal resource.

Specifically, the transmission power for the data transmission on the DMRS port group corresponding to the target reference signal resource may directly be determined according to the second power control parameters.

For example, the network device may configure a group of corresponding power control parameters for each SRS resource of the terminal device and then determine a group of corresponding second power control parameters according to a present target SRS resource. Transmission power for data on a DMRS port group corresponding to the target SRS resource is determined according to the second power control parameters. Different SRS resources may correspond to different second power control parameters. Typically, the second power control parameters may include an uplink path loss estimation value and may also include a path loss estimation value and an open loop power control parameter.

Optionally, the power control parameters include at least one of an open loop power control parameter, a closed loop power control parameter or a path loss estimation value.

In such a manner, different DMRS port groups may correspond to different target reference signal resources and different target reference signal resources may correspond to different power control parameters. Therefore, different transmission power may be adopted for the data transmission on different DMRS port groups and is further matched with beams or channel information of panels for transmitting corresponding data.

A fourth manner: the terminal device determines a panel for transmitting or receiving the reference signal on the target reference signal resource as a panel for the data transmission on the DMRS port group corresponding to the target reference signal resource.

In such a manner, different DMRS port groups may correspond to different target reference signal resources and panels for transmitting or receiving reference signals on different target reference signal resources are different. Therefore, different panels may be adopted for the data transmission on different DMRS port groups, and furthermore, data is transmitted by full use of multiple panels for the terminal device to improve uplink transmission performance of the terminal device.

In the method, if the target reference signal resource is an SRS resource, the corresponding reference signal is an SRS; and if the target reference signal resource is a CSI-RS resource, the corresponding reference signal is a CSI-RS.

Optionally, the terminal device may determine the transmission parameters for the data transmission on the DMRS port group corresponding to the target reference signal resource according to at least one of the first manner, the second manner, the third manner or the fourth manner in 230.

In 240, after the transmission parameters for the data transmission on each DMRS port group are determined, the terminal device performs the data transmission on the at least two DMRS port groups.

Accordingly, in the method for the data transmission of the embodiment of the disclosure, the network device configures the at least two DMRS port groups for the terminal device; and the terminal device determines the target reference signal resource corresponding to each DMRS port group, determines the transmission parameters for the data transmission on the corresponding DMRS port group through the target reference signal resource and then transmits data on the corresponding DMRS port group according to the transmission parameters for the data transmission on each DMRS port group, so that the uplink transmission through multiple panels can be implemented, and an uplink transmission rate can be improved.

Figure 3:
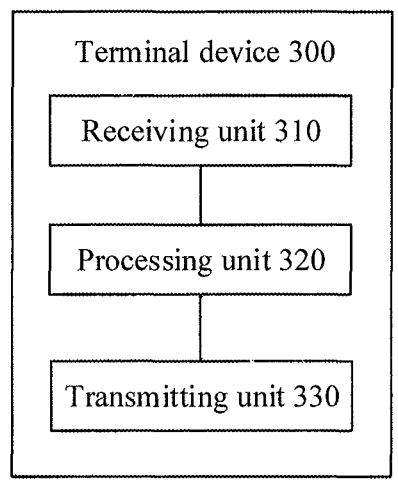
FIG. 3 is a schematic block diagram of a terminal device according to an embodiment of the disclosure.

FIG. 3 is a schematic block diagram of a terminal device 300 according to an embodiment of the disclosure. As shown in FIG. 3, the terminal device 300 includes a receiving unit 310, a processing unit 320 and a transmitting unit 330.

The receiving unit 310 is configured to receive at least two DMRS port groups configured by a network device.

The processing unit 320 is configured to determine a target reference signal resource corresponding to each of the at least two DMRS port groups.

The processing unit 320 is further configured to determine transmission parameters for the data transmission on the DMRS port group corresponding to the target reference signal resource according to the target reference signal resource.

The transmitting unit 330 is configured to, after the processing unit determines the transmission parameters for the data transmission on each DMRS port group, perform the data transmission on the at least two DMRS port groups.

Optionally, the receiving unit 310 is specifically configured to:

receive the at least two DMRS port groups configured by the network device through high-layer signaling; or, receive the at least two DMRS port groups indicated by the network device through DCI from multiple DMRS port groups, herein the multiple DMRS port groups are DMRS port groups pre-configured by the network device through the high-layer signaling.

Optionally, the receiving unit 310 is specifically configured to:

receive the number of the at least two DMRS port groups indicated by the network device through the high-layer signaling or the DCI; and determine DMRS ports included in each of the at least two DMRS port groups according to the number of the at least two DMRS port groups and a first preset condition, herein the first preset condition is DMRS ports, predetermined by the network device and a terminal device, included in each DMRS port group under a present rank.

Optionally, the processing unit 320 is specifically configured to:

receive resource indication information carried by the DCI used to schedule the data transmission on the at least two DMRS port groups from the network device, herein the resource indication information is used to indicate the target reference signal resource corresponding to each DMRS port group; and determine the target reference signal resource corresponding to each DMRS port group according to the resource indication information.

Optionally, the processing unit 320 is specifically configured to:

receive the target reference signal resource, which is configured for each of the at least two DMRS port groups by the network device through the high-layer signaling.

Optionally, the processing unit 320 is specifically configured to:

acquire precoding matrix indication information from the network device; and determine a precoding matrix for the data transmission on the DMRS port group corresponding to the target reference signal resource according to the number of antenna ports in the target reference signal resource and the precoding matrix indication information.

Optionally, the processing unit 320 is specifically configured to:

determine a beam for transmitting or receiving a reference signal on the target reference signal resource as a beam for the data transmission on the DMRS port group corresponding to the target reference signal resource.

Optionally, the processing unit 320 is specifically configured to:

determine transmission power for the data transmission on the DMRS port group corresponding to the target reference signal resource according to power control parameters corresponding to the target reference signal resource.

Optionally, the processing unit 320 is specifically configured to:

determine the transmission power for the data transmission on the DMRS port group corresponding to the target reference signal resource according to first power control parameters, herein the first power control parameters are power control parameters used to calculate transmission power for reference signal transmission on the target reference signal resource.

Optionally, the processing unit 320 is specifically configured to:

determine the transmission power for the data transmission on the DMRS port group corresponding to the target reference signal resource according to second power control parameters, herein the second power control parameters are power control parameters pre-configured by the network device to be associated with the target reference signal resource or the indication information of the target reference signal resource.

Optionally, the power control parameters includes at least one of an open loop power control parameter, a closed loop power control parameter or a path loss estimation value.

Optionally, the processing unit 320 is specifically configured to:

determine a panel for transmitting or receiving the reference signal on the target reference signal resource as a panel for the data transmission on the DMRS port group corresponding to the target reference signal resource.

Optionally, the target reference signal resource is an SRS resource or a CSI-RS resource.

It is to be understood that the terminal device 300 according to the embodiment of the disclosure may correspond to the terminal device in the method embodiment of the disclosure and the abovementioned and other operations and/or functions of each unit of the terminal device 300 are adopted to implement the corresponding procedures executed by the terminal device in the method 200 in FIG. 2 respectively and will not be elaborated herein for simplicity.

Figure 4:
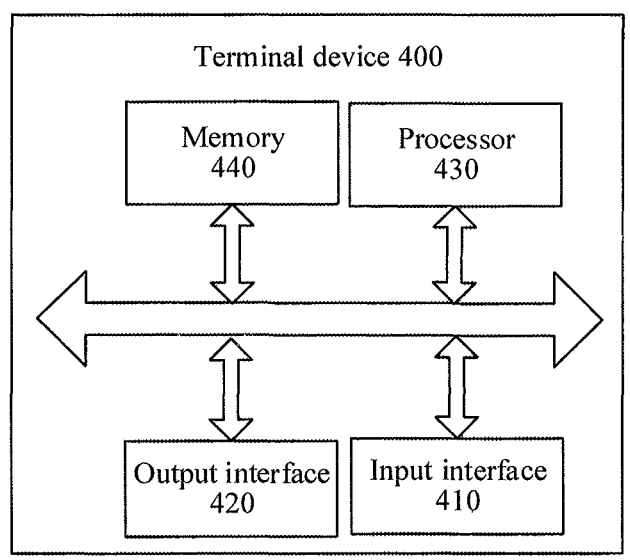
FIG. 4 is a schematic block diagram of a terminal device according to an embodiment of the disclosure.

As shown in FIG. 4, an embodiment of the disclosure also provides a terminal device 400. The terminal device 400 may be the terminal device 300 in FIG. 3, and may be configured to execute contents of the terminal device corresponding to the method 200 in FIG. 2. The device 400 includes an input interface 410, an output interface 420, a processor 430 and a memory 440. The input interface 410, the output interface 420, the processor 430 and the memory 440 may be connected through an internal communication connecting line. The memory 440 is configured to store programs, instructions or codes. The processor 430 is configured to execute the programs, instructions or codes in the memory 440 to control the input interface 410 to receive signals, control the output interface 420 to transmit signals and complete operations in the method embodiments.

It is to be understood that, in the embodiment of the disclosure, the processor 430 may be a Central Processing Unit (CPU) and the processor 430 may also be other universal processor, a Digital Signal Processor (DSP), an Application Specific Integrated Circuit (ASIC), a Field-Programmable Gate Array (FPGA) or other programmable logic device, discrete gate or transistor logic device, and discrete hardware component and the like. The universal processor may be a microprocessor or the processor may also be any conventional processor and the like.

The memory 440 may include a Read-Only Memory (ROM) and a Random Access Memory (RAM) and provides instructions and data for the processor 430. A part of the memory 440 may further include a nonvolatile RAM. For example, the memory 440 may further store information of a device type.

In an implementation process, each content of the method may be completed by an integrated logic circuit of hardware of the processor 430 or an instruction in a software form. The contents of the method disclosed in combination with the embodiments of the disclosure may be directly embodied to be executed and completed by a hardware processor or executed and completed by a combination of hardware and software modules of the processor. The software module may be located in a mature storage medium in this field such as a RAM, a flash memory, a ROM, a Programmable ROM (PROM) or Electrically Erasable PROM (EEPROM) and a register. The storage medium is located in the memory 440. The processor 430 reads information in the memory 440 and completes the contents of the method in combination with hardware. No more detailed descriptions will be made herein to avoid repetitions.

In a specific implementation mode, the receiving unit 310 in FIG. 3 may be implemented by the input interface 410 in FIG. 4, the transmitting unit 330 in FIG. 3 may be implemented by the output interface 420 in FIG. 4 and the processing unit 320 in FIG. 3 may be implemented by the processor 430 in FIG. 4.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for data transmission, comprising:
    receiving at least two Demodulation Reference Signal (DMRS) port groups configured by a network device;
    determining a target reference signal resource corresponding to each of the at least two DMRS port groups;
    determining, according to the target reference signal resource, transmission parameters for data transmission on the DMRS port group corresponding to the target reference signal resource; and
    after determining the transmission parameters for the data transmission on each DMRS port group, performing the data transmission on the at least two DMRS port groups.

2. The method of claim 1, wherein receiving the at least two DMRS port groups configured by the network device comprises:
    receiving the at least two DMRS port groups configured by the network device through high-layer signaling; or
    receiving the at least two DMRS port groups indicated by the network device through Downlink Control Information (DCI) from a plurality of DMRS port groups, wherein the plurality of DMRS port groups are DMRS port groups pre-configured by the network device through high-layer signaling.

3. The method of claim 1, wherein determining the target reference signal resource corresponding to each of the at least two DMRS port groups comprises:
    receiving, from the network device, resource indication information carried by Downlink Control Information (DCI) used to schedule the data transmission on the at least two DMRS port groups, wherein the resource indication information is used to indicate the target reference signal resource corresponding to each DMRS port group; and
    determining the target reference signal resource corresponding to each DMRS port group according to the resource indication information.

4. The method of claim 1, wherein determining, according to the target reference signal resource, the transmission parameters for the data transmission on the DMRS port group corresponding to the target reference signal resource comprises:
    acquiring precoding matrix indication information from the network device; and
    determining, according to a number of antenna ports in the target reference signal resource and the precoding matrix indication information, a precoding matrix for the data transmission on the DMRS port group corresponding to the target reference signal resource.

5. The method of claim 1, wherein determining, according to the target reference signal resource, the transmission parameters for the data transmission on the DMRS port group corresponding to the target reference signal resource comprises:
    determining a beam for transmitting or receiving a reference signal on the target reference signal resource as a beam for the data transmission on the DMRS port group corresponding to the target reference signal resource.

6. The method of claim 1, wherein determining, according to the target reference signal resource, the transmission parameters for the data transmission on the DMRS port group corresponding to the target reference signal resource comprises:
    determining, according to power control parameters corresponding to the target reference signal resource, transmission power for the data transmission on the DMRS port group corresponding to the target reference signal resource.

7. The method of claim 6, wherein determining, according to the power control parameters corresponding to the target reference signal resource, the transmission power for the data transmission on the DMRS port group corresponding to the target reference signal resource comprises:
    determining, according to second power control parameters, the transmission power for the data transmission on the DMRS port group corresponding to the target reference signal resource, wherein the second power control parameters are power control parameters pre-configured by the network device to be associated with the target reference signal resource or the indication information of the target reference signal resource.

8. The method of claim 6, wherein the power control parameters comprises at least one of an open loop power control parameter, a closed loop power control parameter or a path loss estimation value.

9. The method of claim 1, wherein determining, according to the target reference signal resource, the transmission parameters for the data transmission on the DMRS port group corresponding to the target reference signal resource comprises:

determining a panel for transmitting or receiving the reference signal on the target reference signal resource as a panel for data transmission on the DMRS port group corresponding to the target reference signal resource.

10. The method of claim 1, wherein the target reference signal resource is a Sounding Reference Signal (SRS) resource or a Channel State Information Reference Signal (CSI-RS) resource.

11. A terminal device, comprising:

an input interface, configured to receive at least two Demodulation Reference Signal (DMRS) port groups configured by a network device;

a processor, configured to determine a target reference signal resource corresponding to each of the at least two DMRS port groups, wherein the processor is further configured to determine, according to the target reference signal resource, transmission parameters for data transmission on the DMRS port group corresponding to the target reference signal resource; and an output interface, configured to, after the processor determines the transmission parameters for the data transmission on each DMRS port group, perform the data transmission on the at least two DMRS port groups.

12. The terminal device of claim 11, wherein the input interface is specifically configured to:

receive the at least two DMRS port groups configured by the network device through high-layer signaling; or receive the at least two DMRS port groups indicated by the network device through Downlink Control Information (DCI) from a plurality of DMRS port groups, wherein the plurality of DMRS port groups are DMRS port groups pre-configured by the network device through high-layer signaling.

13. The terminal device of claim 11, wherein the processor is specifically configured to:

receive, from the network device, resource indication information carried by Downlink Control Information (DCI) used to schedule the data transmission on the at least two DMRS port groups, wherein the resource indication information is used to indicate the target reference signal resource corresponding to each DMRS port group; and determine the target reference signal resource corresponding to each DMRS port group according to the resource indication information.

14. The terminal device of claim 11, wherein the processor is specifically configured to:

acquire precoding matrix indication information from the network device; and determine, according to a number of antenna ports in the target reference signal resource and the precoding matrix indication information, a precoding matrix for the data transmission on the DMRS port group corresponding to the target reference signal resource.

15. The terminal device of claim 11, wherein the processing unit is specifically configured to:

determine a beam for transmitting or receiving a reference signal on the target reference signal resource as a beam for the data transmission on the DMRS port group corresponding to the target reference signal resource.

16. The terminal device of claim 11, wherein the processor is specifically configured to:

determine, according to power control parameters corresponding to the target reference signal resource, transmission power for the data transmission on the DMRS port group corresponding to the target reference signal resource.

17. The terminal device of claim 16, wherein the processor is specifically configured to:

determine, according to second power control parameters, the transmission power for the data transmission on the DMRS port group corresponding to the target reference signal resource, wherein the second power control parameters are a power control parameters pre-configured by the network device to be associated with the target reference signal resource or the indication information of the target reference signal resource.

18. The terminal device of claim 16, wherein the power control parameter comprises at least one of an open loop power control parameter, a closed loop power control parameter or a path loss estimation value.

19. The terminal device of claim 11, wherein the processor is specifically configured to:

determine a panel for transmitting or receiving the reference signal on the target reference signal resource as a panel for the data transmission on the DMRS port group corresponding to the target reference signal resource.

20. The terminal device of claim 11, wherein the target reference signal resource is a Sounding Reference Signal (SRS) resource or a Channel State Information Reference Signal (CSI-RS) resource.

\* \* \* \* \*